United States Patent
Yamada et al.

(10) Patent No.: US 9,512,785 B2
(45) Date of Patent: Dec. 6, 2016

(54) EXHAUST GAS PURIFICATION SYSTEM FOR INTERNAL COMBUSTION ENGINE

(71) Applicant: MITSUBISHI HEAVY INDUSTRIES, LTD., Tokyo (JP)

(72) Inventors: Satoshi Yamada, Tokyo (JP); Tomohide Yamada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 91 days.

(21) Appl. No.: 14/352,542

(22) PCT Filed: Nov. 6, 2012

(86) PCT No.: PCT/JP2012/078674
§ 371 (c)(1),
(2) Date: Apr. 17, 2014

(87) PCT Pub. No.: WO2013/073409
PCT Pub. Date: May 23, 2013

(65) Prior Publication Data
US 2014/0251268 A1 Sep. 11, 2014

(30) Foreign Application Priority Data
Nov. 16, 2011 (JP) ................................. 2011-251048

(51) Int. Cl.
*B60T 7/12* (2006.01)
*F02D 13/02* (2006.01)
(Continued)

(52) U.S. Cl.
CPC ............... *F02D 13/02* (2013.01); *F01N 3/023* (2013.01); *F01N 3/106* (2013.01); *F01N 3/2066* (2013.01);
(Continued)

(58) Field of Classification Search
CPC .. F02D 13/02; F02D 41/401; F02D 41/0255; F02D 41/0002; F02D 35/023; F02D 35/024; F02D 35/026; F02D 2200/021; F02D 41/0007; F01N 3/2066; F01N 3/106; F01N 3/023; Y02T 10/44; Y02T 10/42

USPC .......... 60/274, 277, 286, 299; 123/344, 345, 123/435, 406.2, 406.26, 406.43; 701/105
See application file for complete search history.

(56) References Cited

U.S. PATENT DOCUMENTS 4,466,410 A    8/1984   Sakakibara et al.
4,685,290 A * 8/1987   Kamiya .................. F01N 3/027
                                               60/274

(Continued)

FOREIGN PATENT DOCUMENTS

CN          1463322 A     12/2003
CN          1989320 A      6/2007
(Continued)

OTHER PUBLICATIONS

Office Action issued in corresponding Japanese Patent Application No. 2011-251048, issued on May 15, 2015, along with an English Translation.
(Continued)

*Primary Examiner* — Joseph Dallo
(74) *Attorney, Agent, or Firm* — Birch, Stewart, Kolasch & Birch, LLP

(57) ABSTRACT

It is intended to provide an exhaust gas purification system for an internal combustion engine, which is capable of suppressing HC emission increase and raising the temperature of an exhaust gas purifier at an early stage while maintaining stable combustion during the warm-up operation such as immediately after the engine starting. The system is provided with: an air flow control unit 50 for reducing a flow rate of air supplied to the engine 1 to raise a temperature of the exhaust gas exhausted from the engine 1; and an activation timing control unit 52 for controlling a timing of activating the air flow control unit 50, and the activation timing control unit is configured to control the timing of activating the air flow control unit 50 so that a combustion state in the engine 1 does not become unstable when the air flow control unit 50 is activated and the air to be supplied to the engine 1 is reduced.

2 Claims, 18 Drawing Sheets

(51) Int. Cl.
*F01N 3/023* (2006.01)
*F02D 35/02* (2006.01)
*F02D 41/00* (2006.01)
*F01N 3/10* (2006.01)
*F01N 3/20* (2006.01)
*F02D 41/02* (2006.01)
*F02D 41/40* (2006.01)

(52) U.S. Cl.
CPC ......... *F02D 35/023* (2013.01); *F02D 41/0002* (2013.01); *F02D 41/0255* (2013.01); *F02D 41/401* (2013.01); *F02D 35/024* (2013.01); *F02D 35/026* (2013.01); *F02D 41/0007* (2013.01); *F02D 2200/021* (2013.01); *F02D 2200/0414* (2013.01); *F02D 2200/703* (2013.01); *Y02T 10/24* (2013.01); *Y02T 10/26* (2013.01); *Y02T 10/42* (2013.01); *Y02T 10/44* (2013.01)

(56) References Cited

U.S. PATENT DOCUMENTS

| | | | |
|---|---|---|---|
| 5,652,380 A | | 7/1997 | Machida |
| 6,644,020 B2* | | 11/2003 | Kuenstler ............... F01N 3/023 123/299 |
| 6,698,192 B2* | | 3/2004 | Ootake .................. F01N 9/002 60/274 |
| 6,823,661 B2* | | 11/2004 | Minami .................... F01L 1/34 123/90.15 |
| 7,104,051 B2* | | 9/2006 | Shimasaki ............. F01N 3/0253 60/274 |
| 8,091,347 B2* | | 1/2012 | Hara ..................... F01N 3/0222 60/274 |
| 8,381,519 B2* | | 2/2013 | Singh ................... F01N 3/0236 123/568.22 |
| 8,789,369 B2* | | 7/2014 | Sato ........................ F02B 37/20 415/13 |
| 2004/0000136 A1* | | 1/2004 | Miura ................... F01N 3/2006 60/284 |
| 2006/0254261 A1* | | 11/2006 | Ishihara .............. F02D 41/0002 60/295 |
| 2007/0089400 A1 | | 4/2007 | Huang |
| 2008/0264045 A1* | | 10/2008 | Hara ..................... F01N 3/0222 60/295 |
| 2010/0107608 A1* | | 5/2010 | Mitsutani ............... B60K 6/445 60/285 |
| 2010/0287911 A1* | | 11/2010 | Katsuki .............. B01D 53/9477 60/274 |

FOREIGN PATENT DOCUMENTS

| | | |
|---|---|---|
| EP | 1 777 398 A2 | 4/2007 |
| FR | 2 846 999 A1 | 5/2004 |
| JP | 1-211655 A | 8/1989 |
| JP | 2000-328970 A | 11/2000 |
| JP | 2001-254645 A | 9/2001 |
| JP | 2001-336467 A | 12/2001 |
| JP | 2002-339764 A | 11/2002 |
| JP | 2003-41983 A | 2/2003 |
| JP | 2003-65121 A | 3/2003 |
| JP | 2004-138036 A | 5/2004 |
| JP | 2006-112363 A | 4/2006 |
| JP | 2006-241978 A | 9/2006 |
| JP | 2006-316735 A | 11/2006 |
| JP | 2009-214704 A | 9/2009 |
| JP | 2009-281246 A | 12/2009 |
| JP | 2010-188934 A | 9/2010 |

OTHER PUBLICATIONS

International Preliminary Report on Patentability mailed May 30, 2014 for PCT/JP2012/078674 with Egnlish Translation.
International Search Report dated Feb. 12, 2013 for PCT/JP2012/078674.
Japanese Decision to Grant a Patent for Japanese Application No. 2011-251048, mailed Jul. 15, 2016, and an English Translation thereof.
Office Action issued in corresponding Japanese Application No. 2011-251048 on Dec. 17, 2015 with an English Translation.
Extended European Search Report, issued Feb. 18, 2016, for European Application No. 12849177.6.
Chinese Notice of Allowance for Chinese Application No. 201280049773.8, issued Jun. 2, 2016, with an English Translation.
Office Action issued in corresponding Chinese Application No. 201280049773.8, effective Oct. 27, 2015 with an English Translation.

* cited by examiner

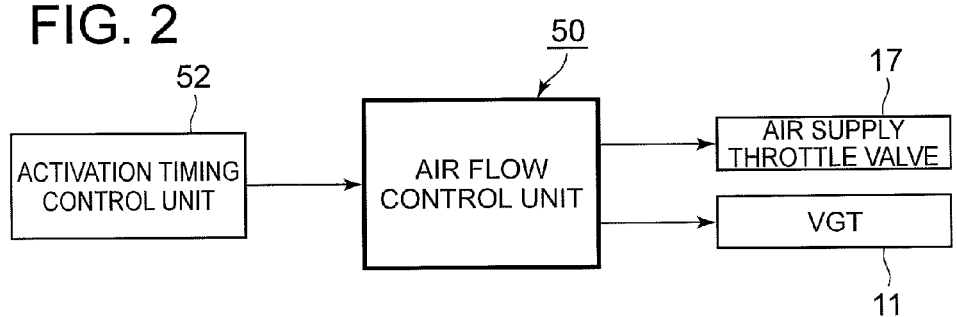
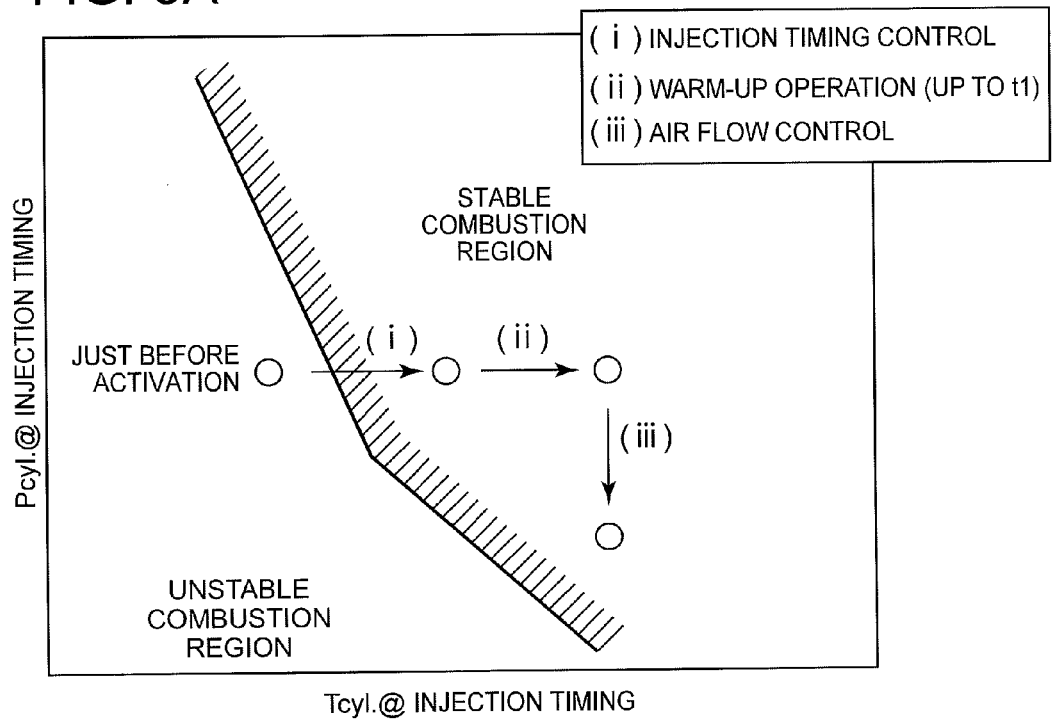
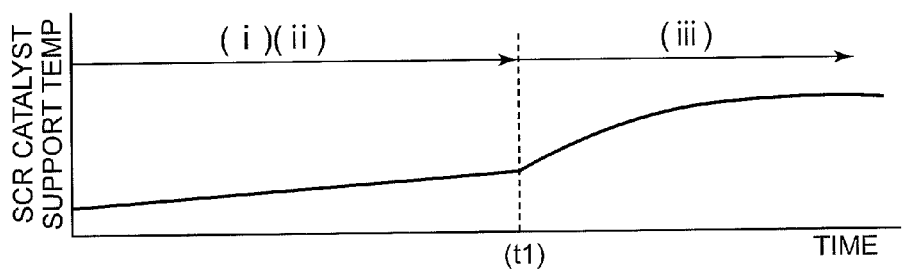

(i) INJECTION TIMING CONTROL
(ii) WARM-UP OPERATION (UP TO tw1)
(iii) AIR FLOW CONTROL

THRESHOLD OF COOLING WATER TEMPERATURE, (CORRECTION) [TEMP PRESSURE]

EXHAUST GAS PURIFICATION SYSTEM FOR INTERNAL COMBUSTION ENGINE

TECHNICAL FIELD

The present invention relates to an exhaust gas purification system for an internal combustion engine provided with an exhaust gas purifier such as a DOC, a DPF and a SCR, and particularly relates to a technique for raising a temperature of the exhaust gas purifier at an early stage during a warm-up operation such as immediately after engine starting.

BACKGROUND ART

The exhaust gas purifier such as a diesel oxidation catalyst (DOC), a diesel particulate filter (DPF), a selective catalytic reduction catalyst (SCR) fully functions once a certain temperature environment or above is established. For instance, FIG. 18 is a table representing relationships among a temperature of a SCR catalyst, NOx concentration at an inlet and an outlet of the SCR and an operation time of the engine in the SCR unit for reducing nitrogen oxides (NOx). As illustrated in FIG. 18, the NOx concentration at the outlet of the SCR is relatively high until the catalyst temperature of the SCR unit reaches its activating temperature, and the SCR unit does not fully demonstrate the NOx purification function. Therefore it is necessary to raise the temperature of the exhaust gas purifier such as the SCR unit at an early stage during the warm-up operation such as immediately after starting the engine, in order to perform the exhaust gas purification at an early stage.

In order to raise the temperature of the exhaust gas purifier at the early stage, it is known to change a fuel injection timing, or to control (reduce) a flow rate of the air to be supplied to the engine by controlling a variable supercharger and an air supply throttle. For instance, disclosed in Patent Literature 1 is an example of controlling the fuel injection timing. Disclosed in Patent Literature 2 is an example of controlling the flow rate of the air to be supplied to the engine.

CITATION LIST

Patent Literature

[PTL 1]
JP 2003-65121 A
[PTL 2]
JP 3972611 B

SUMMARY

Technical Problem

Among the above-mentioned techniques of raising the temperature of the exhaust gas purifier at the early stage, the air flow control is comparatively most effective in raising the temperature. However, by controlling the flow rate of the air supplied to the engine, the pressure in the cylinder decreases. If the air flow control is performed at an early stage of the warm-up operation, combustion in the engine becomes unstable.

FIG. 19 is an illustration of a relationship between timing for starting the air flow control and an engine combustion state according to related art. It is determined whether the combustion state is stable or unstable based on a temperature inside the cylinder ($T_{cyl}$) and a pressure inside the cylinder ($P_{cyl}$) at the fuel injection timing. The higher the temperature and the pressure are inside the cylinder, the more stable the combustion state is. As illustrated in FIG. 19, when the air flow control (ii) is performed immediately in such a state that the engine is still in an unstable combustion state right after the engine starting, the combustion state becomes more unstable. Further, when the injection timing control (i) is performed prior to the air flow control (ii) so as to raise the temperature inside the cylinder, if the temperature is raised insufficiently in the cylinder, the air flow control (ii') causes the pressure in the cylinder to decrease, resulting in unstable combustion state.

Once the engine is in the unstable combustion state, hydrocarbon (HC) emission increases. In the worst scenario, this causes fire extinction and then the engine stops. As the restriction on the exhaust gas emission becomes stricter every year, it is desire to develop an exhaust gas purification system which is capable of raising the temperature of the exhaust gas purifier at an early stage while maintaining the engine in the stable combustion state during the warm-up operation such as immediately after the engine starting.

In view of the above issues, it is an object of the present invention to provide an exhaust gas purification system for an internal combustion engine, which is capable of suppressing HC emission increase and raising the temperature of the exhaust gas purifier at an early stage while maintaining the stable combustion state during the warm-up operation such as immediately after the engine starting.

Solution to Problem

The present invention was made to achieve the object of the present invention in view of the above issues and provides an exhaust gas purification system for an internal combustion engine provided with an engine, an exhaust passage where exhaust gas exhausted from the engine passes, and an exhaust gas purifier installed in the exhaust passage. The exhaust gas purification system comprises:

an air flow control unit for reducing a flow rate of air to be supplied to the engine so as to raise a temperature of the exhaust gas exhausted from the engine; and an activation timing control unit for controlling a timing of activating the air flow control unit, wherein the activation timing control unit is configured to control the timing of activating the air flow control unit so that a combustion state in the engine does not become unstable when the air flow control unit is activated and the air to be supplied to the engine is reduced.

As described above, even when the air flow control unit is activated and the air to be supplied to the engine is reduced, the timing of activating the air flow control unit is controlled by the activation timing control unit so that the combustion state in the engine does not become unstable. There is a concern that the air flow control possibly makes the engine combustion unstable while being effective in raising the temperature. This concern is addressed by the present invention. According to the present invention, the exhaust gas purification system for the internal combustion engine is capable of suppressing HC emission increase and raising the temperature of the exhaust gas purifier at an early stage while maintaining the stable combustion state during the warm-up operation such as immediately after the engine starting.

In the above invention,
the activation timing control unit may be configured to activate the air flow control unit after prescribed time has passed since starting of the engine, the prescribed time being calculated based on a rotation speed of the engine and a fuel injection amount. In this case, the prescribed time may be corrected based on at least one of an ambient temperature or an ambient pressure in such a state that the engine operates.

According to this aspect of the invention, the temperature rise of the exhaust gas purifier just before the engine starting and suppression of the HC exhaust increase can be controlled by a simple method. In this case, the prescribed time to the activation of the air flow control unit is corrected according to the ambient temperature and/or the ambient pressure and thus the timing for activating the air flow control unit can be determined with precision in accordance with the ambient temperature and the ambient pressure.

Further, in the above invention,
the activation timing control unit may be configured to activate the air flow control unit when a temperature of cooling water for cooling the engine or a temperature of lubricating oil flowing inside the engine becomes not less than a threshold value.

In this case, the threshold value of the cooling water or the lubricating oil may be corrected based on at least one of an ambient temperature or an ambient pressure in such a state that the engine is activated.

According to this aspect of the invention, the timing for activating the air flow control unit can be controlled by knowing the combustion state in the engine from the temperature of the cooling water or the lubricating oil. Thus, it is possible to secure stable combustion in the engine and also to achieve temperature rise of the exhaust gas purifiers at an early stage. In this case, the threshold value of the temperature of the cooling water or the lubricating oil is corrected according to the ambient temperature and/or the ambient pressure to precisely determine the timing for activating the air flow control unit in accordance with the ambient temperature and/or the ambient pressure.

In the above invention,
the activation timing control unit may be configured to estimate a temperature and a pressure in a cylinder of the engine and control the timing of activating the air flow control unit based on the estimated temperature and pressure in the cylinder of the engine, the estimated pressure being estimated According this aspect of the invention, the combustion state in the engine after the air flow control is performed is estimated with precision and then the timing for activating the air flow control unit is controlled. Thus, it is possible to secure stable combustion in the engine and also to achieve temperature rise of the exhaust gas purifier at an early stage.

In the above invention,
the activation timing control unit may comprise a pressure detector for detecting a pressure in a cylinder of the engine, and
the activation timing control unit may be configured to control the timing of activating the air flow control unit based on the pressure in the cylinder detected by the pressure detector.

According to this aspect of the invention, a cylinder pressure in the cylinder is directly measured by the cylinder pressure measuring unit so as to obtain combustion stability of the engine directly and also to control the timing for activating the air flow control unit at the same time. Therefore, the air flow control can be performed while detecting the combustion state in the engine in real time. As a result, it is possible to secure stable combustion in the engine and also to achieve temperature rise of the exhaust gas purifier at an early stage.

Advantageous Effects

According to the present invention, it is possible to provide an exhaust gas purification system for an internal combustion engine, which is capable of securing stable combustion in the engine, suppressing HC emission increase and raising a temperature of an exhaust gas purifier at an early stage during a warm-up operation such as immediately after engine starting.

BRIEF DESCRIPTION OF DRAWINGS

FIG. 2 is a block diagram illustrating an air flow control unit according to embodiments of the present invention.

FIG. 3A is a conceptual drawing illustrating a relationship between a timing of activating an air flow control and an engine combustion state according to a first embodiment.

FIG. 3B is a conceptual drawing illustrating a relationship between an operating time of the engine and a temperature of the SCR catalyst support according to the first embodiment.

DETAILED DESCRIPTION

Embodiments of the present invention will now be described in detail with reference to the accompanying drawings. It is intended, however, that unless particularly specified in these embodiments, dimensions, materials, shape, its relative positions and the like shall be interpreted as illustrative only and not limitative of the scope of the present invention.

Figure 1:
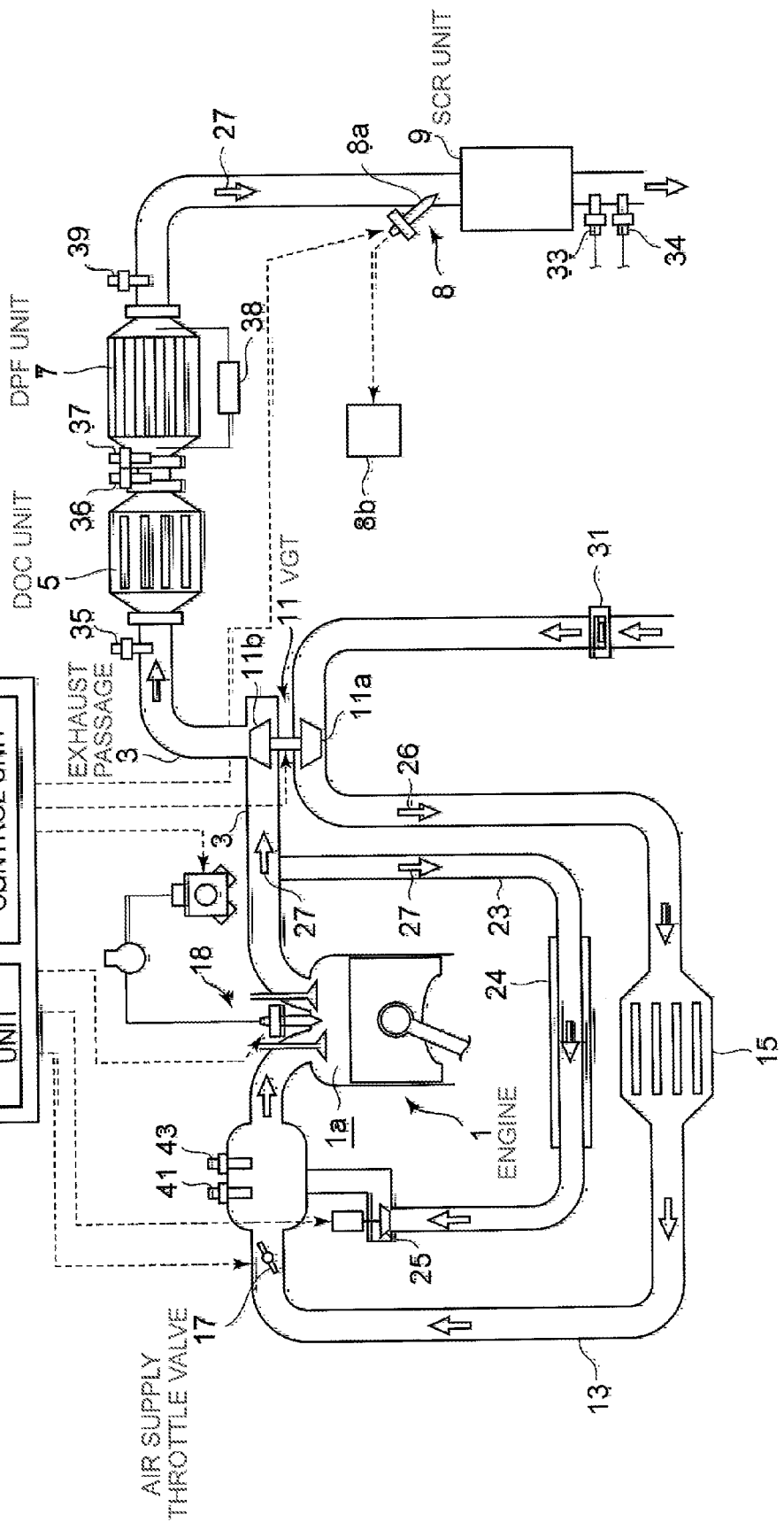
FIG. 1 is an overall structure of a diesel engine equipped with an exhaust gas purification system according to embodiments of the present invention.

FIG. 1 is an overall structure of a diesel engine equipped with an exhaust gas purification system according to embodiments of the present invention. Referring to FIG. 1, the overall structure of the exhaust gas purification system for an internal combustion engine is described.

As illustrated in FIG. 1, the diesel engine equipped with the exhaust purification system is formed by: a variety of devices and pipings such as an engine 1, an exhaust passage 3, an air supply passage 13, a variable geometry turbo-charger 11, a common fuel injection unit 18, and an EGR piping 23; a variety of exhaust gas purification devices such as a DOC unit 5, an oxidation catalyst (DOC unit) 5, a diesel particulate filter (DPF unit) 7, and a selective reduction catalyst (SCR unit) 9; an engine controller (ECU) 19 for controlling these devices; and a variety of sensors.

The exhaust passage 3 is connected to a downstream of the engine 1. The DOC unit 5 and the DPF unit 7 are provided in the exhaust passage 3. The DOC unit 5 is configured to oxidize HC (hydrocarbon) and CO (carbon monoxide) contained in the exhaust gas and also oxidize NO (nitric oxide) contained in the exhaust gas into $NO_2$ (nitrogen oxide). The DPF unit 7 is provided downstream of the DOC unit 5 to capture and remove particulate matter (PM) such as soot contained in the exhaust gas from the exhaust gas.

Further, a urea aqueous injection unit 8 is provided downstream of the DPF unit 7 and immediately downstream of the urea aqueous injection unit 8, a SCR unit 9 is provided. The urea aqueous injection unit 8 injects urea aqueous to the exhaust passage 3 from an injection nozzle 8a in accordance with a control signal from the ECU 19. The urea aqueous is stored in a urea aqueous tank 8b. The urea aqueous injected to the exhaust passage 3 is hydrolyzed by heat of the exhaust gas 27 to ammonia ($NH_3$). The produced ammonia ($NH_3$) becomes reducing agent to perform reduction of NOx contained in the exhaust gas 27 in the SCR unit 9.

To purify the exhaust gas by the DOC unit 5 and the SCR unit 9, the catalyst supported in the DOC unit 5 and the SCR unit 9 needs to be heated to or above the activating temperature. To regenerate the filter by removing the particulate matter collected in the filter, the DPF unit 7 needs to be heated to or above a prescribed temperature. More specifically, it is necessary to heat the exhaust gas purifiers to or above a prescribed temperature for the exhaust gas purifiers to fully function. In the present exhaust gas purification system for an internal combustion engine, an air flow control unit 50 is provided to raise the temperatures of the exhaust gas purifiers. The air flow control unit 50 is described later in details.

The air supply passage 13 is connected to an upstream side of the engine 1. The variable geometry turbocharger 11 is provided between the air supply passage 13 and the exhaust passage 3. The variable geometry turbocharger 11 includes an exhaust gas turbine 11b arranged in the exhaust passage 3 and a compressor 11a arranged in the air supply passage 13. The compressor 11a is driven coaxially by the exhaust gas turbine 11b. Further, the variable geometry turbocharger 11 is configured so that an opening degree of a variable nozzle vane (not shown), an opening degree of a wastegate valve (not shown) are adjusted based on a control signal from the ECU 19 to control a flow rate of air 26 exhausted from the compressor 11a.

An intercooler 15 and an air supply throttle valve 17 are provided in the air supply passage 13. The air 26 exhausted from the compressor 11a is cooled in by the intercooler 15, passes through the air supply throttle valve 17 and then enters a combustion chamber 1a of each cylinder of the engine 1. Meanwhile, the air supply throttle valve 17 is configured so that the opening is adjusted based on the control signal from the ECU 19 to control the flow rate of the air supplied to the engine 1.

In the engine 1, a common rail fuel injection device 18 is provided to inject fuel to the combustion chamber 1a. The common rail fuel injection device 18 is configured so that the injection timing and the injection amount are controller based on the control signal from the ECU 19. An injection timing control which is described later is performed by controlling the injection timing and the amount of fuel injected to the combustion chamber 1a from the common rail fuel injection timing 18 based on the control signal from the ECU 19 to vary the injection timing and injection amount from those of a normal operation mode.

The EGR piping 23 branches from the exhaust passage 3 on the upstream side of the exhaust gas turbine 11b and is connected to a downstream side of the air supply throttle valve 17. In the EGR piping 23, an EGR cooler 24 and an EGR valve 25 are arranged. By controlling opening and closing of the EGR valve 25, the exhaust gas 27 exhausted from the engine 1 partially enters the EGR piping 23 to recirculate to the engine 1.

The exhaust gas 27 exhausted from the engine 1 passes through the exhaust passage 3 to drive the exhaust turbine 11b, thereby coaxially driving the compressor 11a. Then the exhaust gas 27 passes through the exhaust passage 3 and then passes through the DOC unit 5, the DPF unit 7 and the SCR unit 9. In the air supply passage 13, an air flow meter 31 is arranged to detect the flow rate of the air entering the compressor 11a. A signal regarding the detected flow rate of air is inputted to the ECU 19.

In the exhaust passage 3, a DOC inlet temperature sensor 35, a DPF inlet pressure sensor 36, a DPF inlet temperature sensor 37, a DPF pressure difference sensor 38 and a DPF outlet temperature sensor 39 are provided. Signals regarding a DOC inlet temperature sensor, a DPF inlet temperature, etc detected by these sensors are inputted to the ECU 19. On a downstream side of the SCR unit 9, a SCR outlet temperature sensor 33 and a NOx sensor 34 are arranged to detect a temperature at the downstream side of the SCR unit 9 and NOx concentration. Signals regarding the detected temperature and the detected NOx concentration are inputted to the ECU 19.

On a downstream side of the air supply throttle valve 17, an air supply temperature sensor 41 and an air supply pressure sensor 43 are arranged to detect an air supply temperature and an air supply pressure respectively. Signals regarding the detected air supply temperature and the detected air supply pressure are inputted to the ECU 19. An appropriate EGR amount is calculated based on these air supply temperature and air supply pressure so as to control the opening and closing of the EGR valve 25.

In the ECU 19, an engine rotation speed and the fuel injection amount are calculated based on signals inputted from a variety of sensors such as a crank sensor, a cam sensor, an accelerator sensor and a throttle sensor that are not illustrated. Further, a cooling air passage (not shown) is formed around the engine 1 and a cooling water temperature sensor (not shown) is arranged to detect a temperature of the cooling air flowing in the cooling air passage.

The ECU 19 is formed by a microcomputer having a central processing unit (CPU), a random access memory (RAM), a read-only memory (ROM), I/O interface, etc. The signals from the above sensors are inputted to the CPU via the I/O interface. The CPU is configured to perform a variety of controls in accordance with a control program stored in the ROM. As illustrated in FIG. 1, the air flow control unit 50 and an activation timing control unit 52 are formed by the ECU unit 19.

FIG. 2 is a block diagram illustrating the air flow control unit 50. The air flow control unit 50 of the present embodiment is configured to control the opening of the air supply throttle valve 17 and the variable geometry turbocharger 11 based on a command from the activation timing control unit 52 so as to control (reduce) the flow rate of the air supplied to the engine 1. Further, the air flow control unit 50 is not necessary configured to control both the air supply throttle valve 17 and the variable geometry turbocharger 11. The air flow control unit 50b may be configured to control one of the air supply throttle valve 17 and the variable geometry turbocharger 11 so as to control (reduce) the flow rate of the air supplied to the engine 1.

Figure 19:
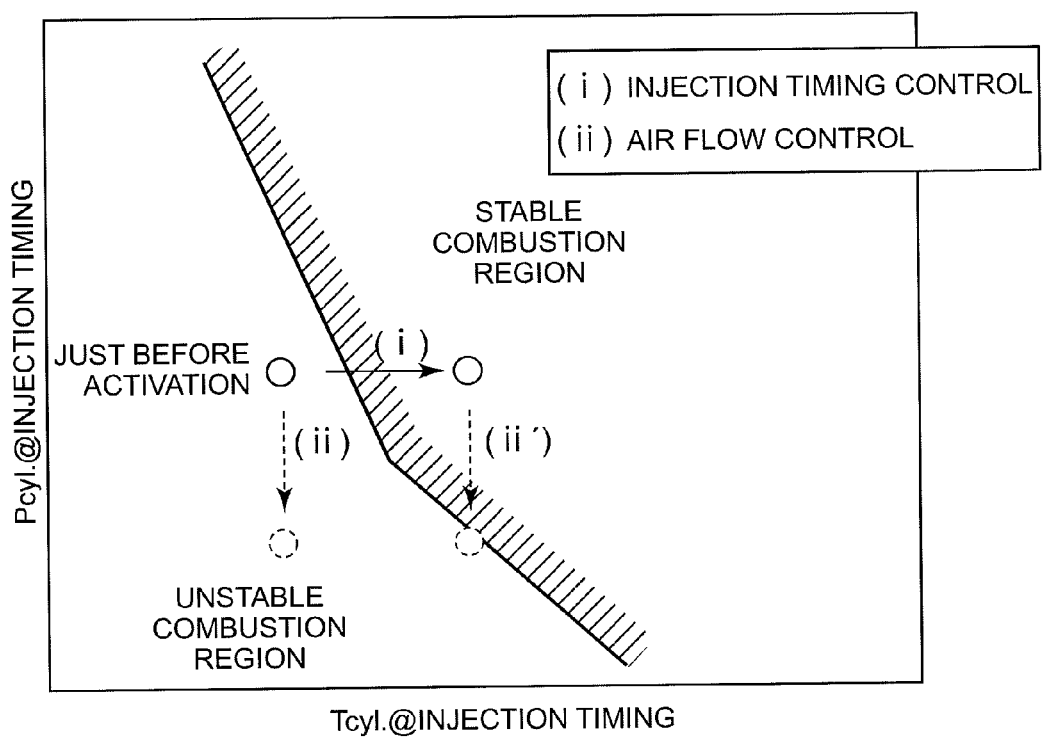
FIG. 19 is a table illustrating a relationship between the timing of activating the air flow control and the combustion state in the engine.

The air flow control has a high effect of raising the temperature and is extremely effective in raising the temperature of the exhaust gas purifier in an early stage during the warm-up operation such as immediately after the engine starting. On the other hand, if the flow rate of the air is controlled too early after the engine starting, the combustion state in the engine becomes unstable as the pressure in the cylinder decreases once the flow rate of the air is controlled as described in FIG. 19.

Therefore, the timing of activating the air flow control unit 50 is controlled by the activating timing control unit 52 so as to avoid the combustion state in the engine being unstable even if the air flow control is performed.

Embodiments of the activation timing control unit 52 are described below in details.

First Embodiment

FIG. 3A is a conceptual drawing representing a relationship between a timing of activating an air flow control and an engine combustion state according to a first embodiment. FIG. 3B is a conceptual drawing representing a relationship between an operating time of the engine and a temperature of the SCR catalyst support according to the first embodiment.

The activation timing control unit 52 of the first embodiment is configured to perform the injection timing control (i) and the warm-up operation (ii) of the engine 1 after the engine starting as illustrated in FIG. 3A and FIG. 3B. The air flow control (iii) is performed after a prescribed time (t1) since the engine starting.

Figure 5:
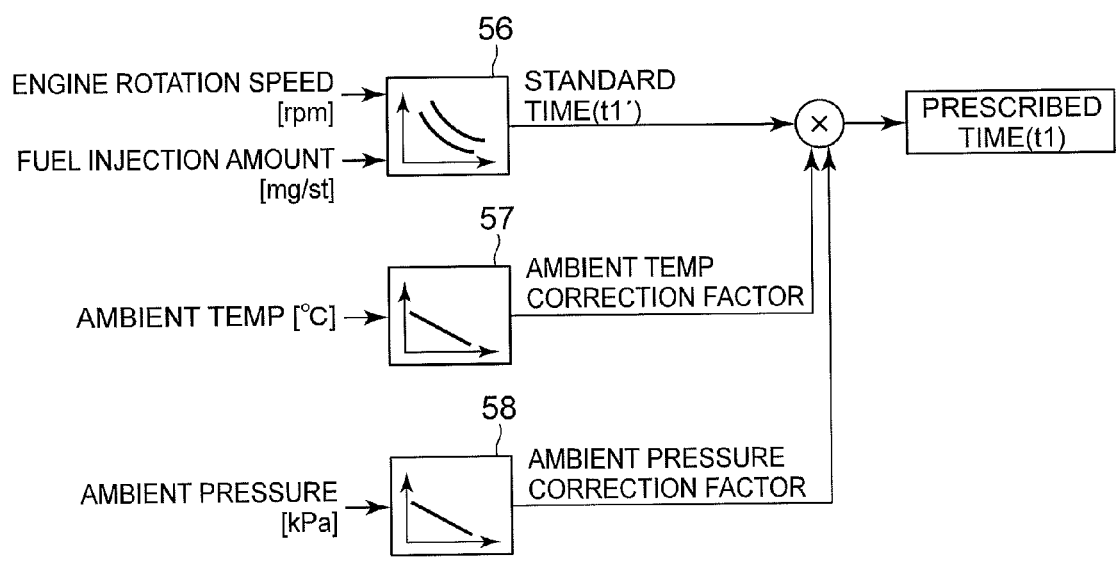
FIG. 5 is a block diagram illustrating calculation of the timing of activating the air flow control according to the first embodiment.

The prescribed time (t1) is calculated as illustrated in FIG. 5 by multiplying a standard time (t1') by a temperature correction factor and a pressure correction factor (temperature/pressure correction). The standard time is obtained from a standard map 56 by inputting the engine rotation speed (Ne) of the engine 1 and the fuel injection amount (Qf) to the standard map 56. The temperature correction factor is obtained from a temperature correction map 57 by inputting an ambient temperature to the temperature correction map 57. The pressure correction factor is obtained from a pressure correction map 58 by inputting an ambient pressure to the pressure correction map 58. These standard map 56, temperature correction map 57 and pressure correction map 58 are created from experiment or the like and are stored in the ROM of the ECU 19 in advance.

In this embodiment, one or neither of the temperature correction and pressure correction may be performed. In the case of performing neither of the temperature correction and pressure correction, the standard time (t1') is the prescribed time (t1) in FIG. 5.

Figure 4A:
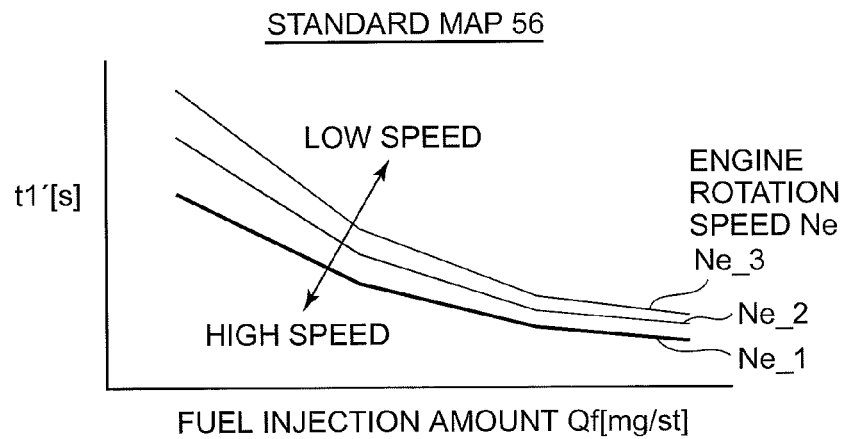
FIG. 4A is a standard map for calculating a timing (prescribed time: t1) of activating an air flow control.
Figure 4B:
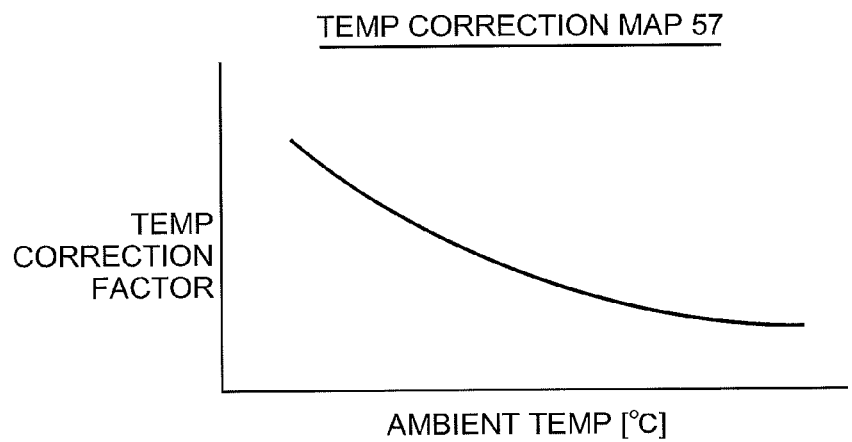
FIG. 4B is an ambient temperature correction map for calculating the timing of activating the air flow control.
Figure 4C:
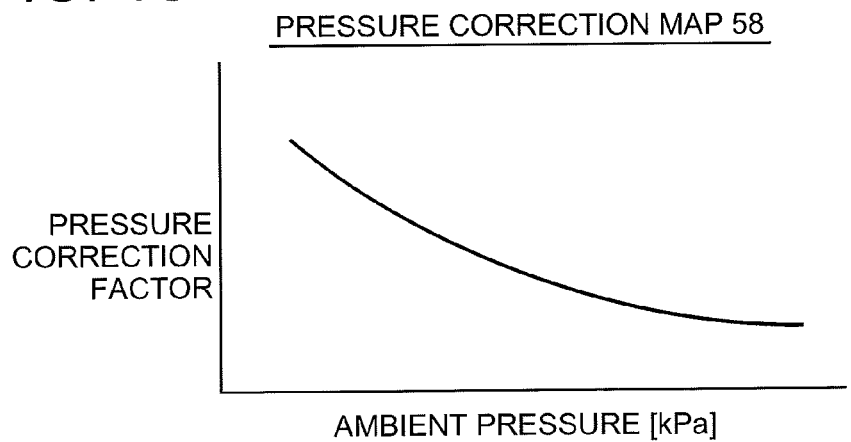
FIG. 4C is an ambient pressure correction map for calculating the timing of activating the air flow control.

The relationship between the engine rotation speed (Ne) and the standard time (t'1) represents in FIG. 4A that the higher the engine rotation speed (Ne) is, the shorter the standard time (t'1) becomes, whereas the lower the engine rotation speed (Ne) is, the longer the standard time (t'1) becomes. The relationship between the fuel injection amount (Qf) and the standard time (t1') represents that the greater the fuel injection amount (Qf) is, the shorter the standard time (t'1) becomes, whereas the smaller the fuel injection amount (Qf) is, the longer the standard time (t'1) becomes. Further, the higher the ambient temperature is, the smaller the temperature correction factor is, as illustrated in FIG. 4B. Furthermore, the higher the ambient pressure is, the smaller the pressure correction factor is, as illustrated in FIG. 4C.

Figure 6:
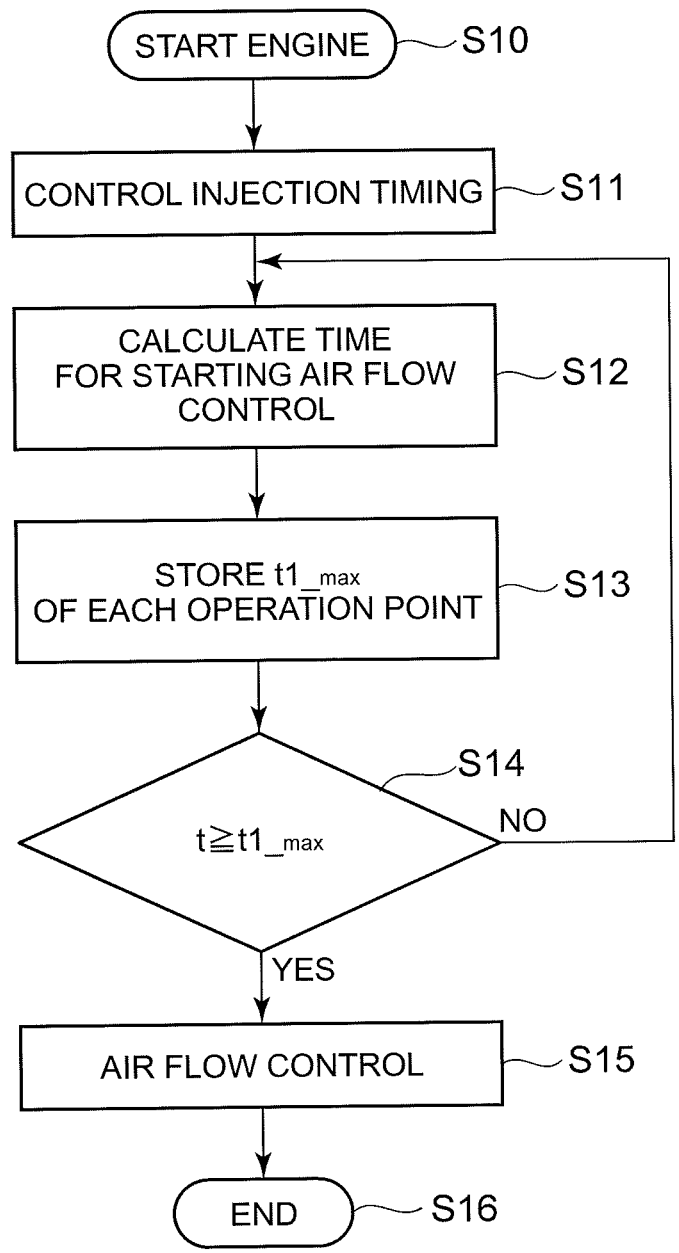
FIG. 6 is a control flow chart according to the first embodiment.

FIG. 6 is a control flow chart according to the first embodiment. As illustrated in FIG. 6, the activation timing control unit 52 according to the first embodiment, after the engine starting (S1), controls the injection timing (S11) to raise the temperature of the engine. As illustrated in FIG. 5, the time for activating the air flow control (the prescribed time: t1) is calculated (S12). Then, the calculated prescribed time (t1) is stored (S13) and the stored prescribed time (t1) is compared with an elapsed time (t) (S14). When t≥t1 (YES in S14), the air flow control is performed (S15). When t<t1 (NO in S14), the process returns to the step S12 without performing the air flow control.

The activation timing control unit 52 according to the first embodiment is configured to activate the air flow control unit 50 after the prescribed time (t1) has elapsed since the starting of the engine 1. The prescribed time (t1) is calculated, as illustrated in FIG. 5, from the standard map 56 by inputting the rotation speed (Ne) of the engine 1 and the fuel injection amount (Qf) into the standard map 56. Further, if desired, the prescribed time (t1) is corrected by the ambient temperature and the ambient pressure of the engine operation state.

According to the first embodiment, the temperature rise of the exhaust gas purifier just before the engine starting and suppression of the HC exhaust increase can be controlled by a simple method. Meanwhile, the prescribed time is corrected according to the ambient temperature and/or the ambient pressure and thus the timing for activating the air flow control unit 50 can be determined precisely in accordance with the ambient temperature and the ambient pressure.

Second Embodiment

Figure 7A:
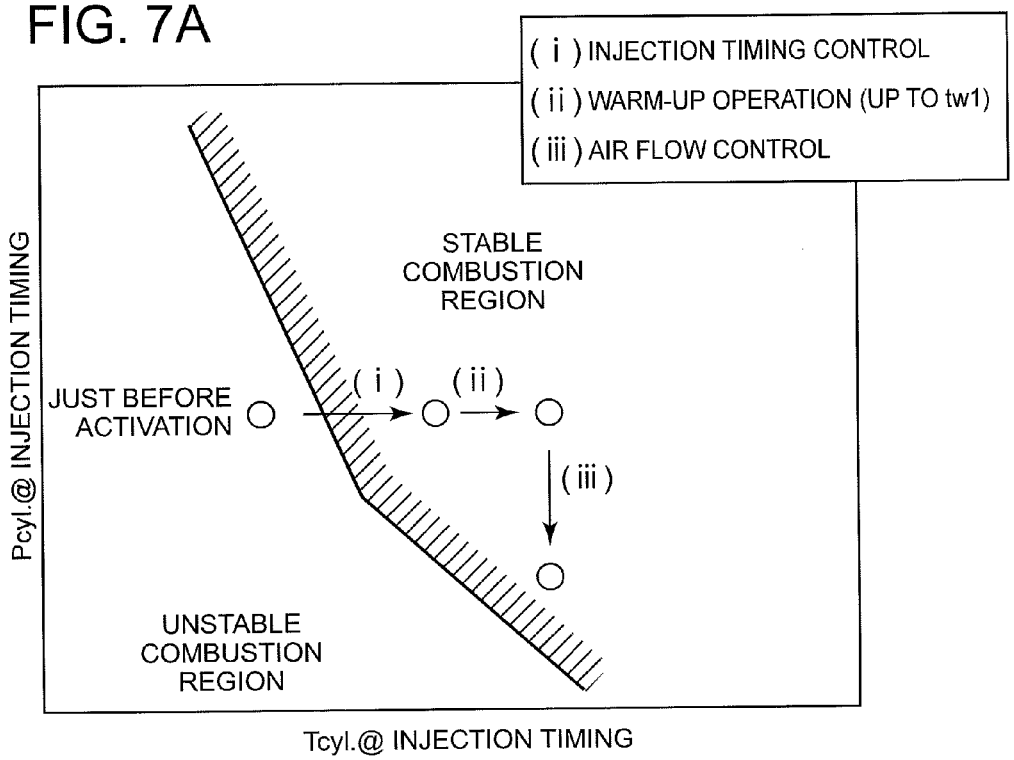
FIG. 7A is a table representing a relationship between the timing of activating the air flow control and a combustion state in the engine according to a second embodiment.
Figure 7B:
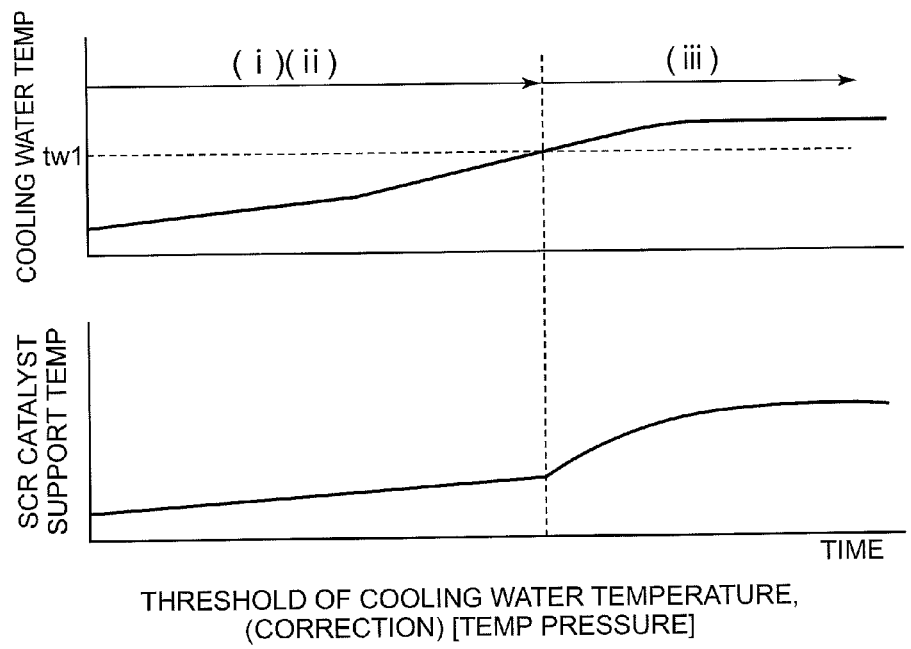
FIG. 7B is a table representing a relationship between an engine operating time and temperatures of SCR catalyst support and cooling water according to the second embodiment.

FIG. 7A is a conceptual drawing representing a relationship between the timing of activating the air flow control and the engine combustion state according to a second embodiment. FIG. 7B is a conceptual drawing representing a relationship between the operating time of the engine and the temperature of the SCR catalyst support and the temperature of the cooling water according to the second embodiment. The activation timing control unit 52 of the second embodiment is configured to perform, after the engine starting, the injection timing control (i) and the warm-up operation (ii) of the engine 1 as illustrated in FIG. 7A and FIG. 7B. The activation timing control unit 52 is configured to perform the air flow control (iii) once the temperature of the engine cooling water reaches a prescribed temperature (tw1) of the cooling water. Further, the temperature of the engine cooling water is obtainable by a cooling water temperature detector or the like (not illustrated).

Figure 9:
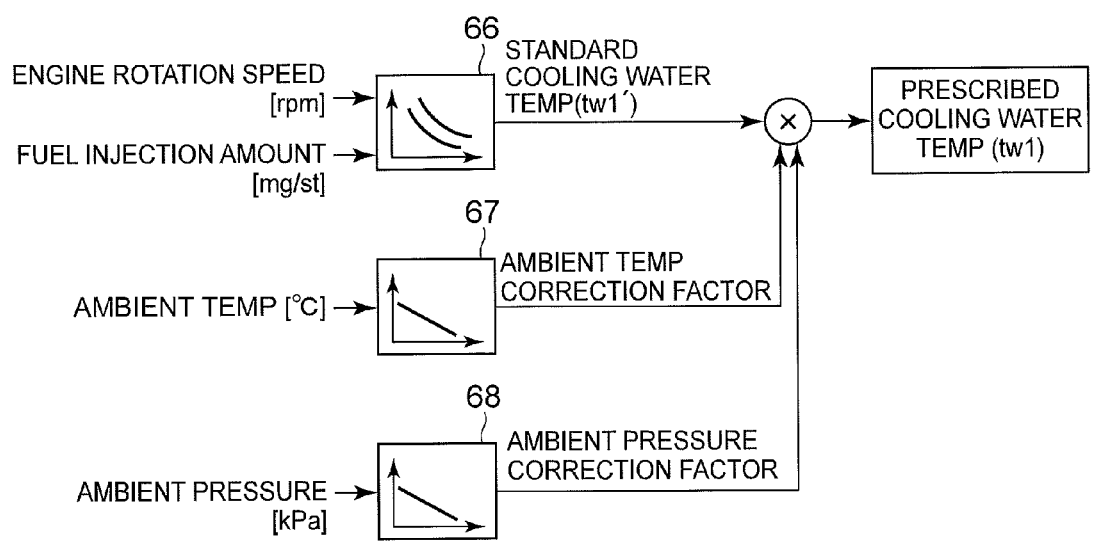
FIG. 9 is a block diagram illustrating calculation of a prescribed temperature (tw1) the cooling water according to the second embodiment.

The prescribed temperature (tw1) of the cooling water is calculated as illustrated in FIG. 9 by multiplying a standard temperature of the cooling water (tw1') by a temperature correction factor and a pressure correction factor (temperature/pressure correction). The standard temperature of the cooling water (tw1') is obtained from a standard map 66 by inputting the engine rotation speed (Ne) of the engine 1 and the fuel injection amount (Qf) to the standard map 66. The temperature correction factor is obtained from a temperature correction map 67 by inputting an ambient temperature to the temperature correction map 67. The pressure correction factor is obtained from a pressure correction map 68 by inputting an ambient pressure to the pressure correction map 68. These standard map 66, temperature correction map 67 and pressure correction map 68 are created from experiment or the like and are stored in the ROM of the ECU 19 in advance.

In this embodiment, one or neither of the temperature correction and pressure correction may be performed. In the case of performing neither of the temperature correction and pressure correction, the standard temperature of the cooling water (tw1') is the prescribed temperature (tw1) in FIG. 9.

Figure 8A:
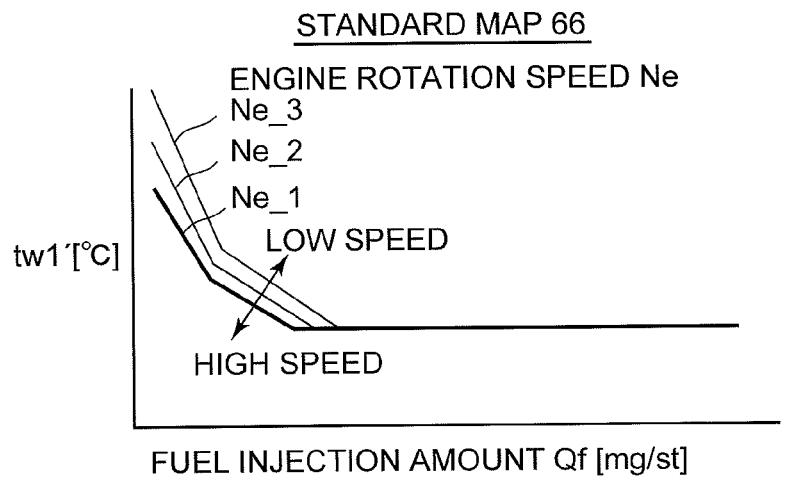
FIG. 8A is a standard map for obtaining a temperature of cooling water according to the second embodiment.
Figure 8B:
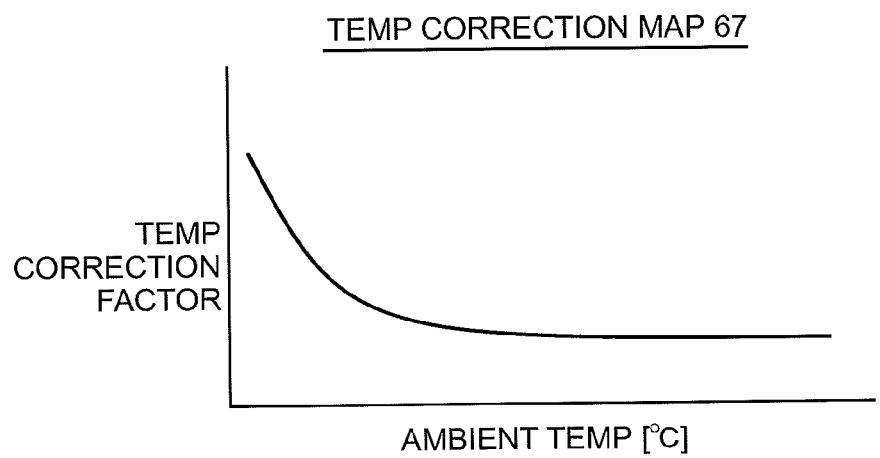
FIG. 8B is an ambient temperature correction map for obtaining a temperature of cooling water according to the second embodiment.
Figure 8C:
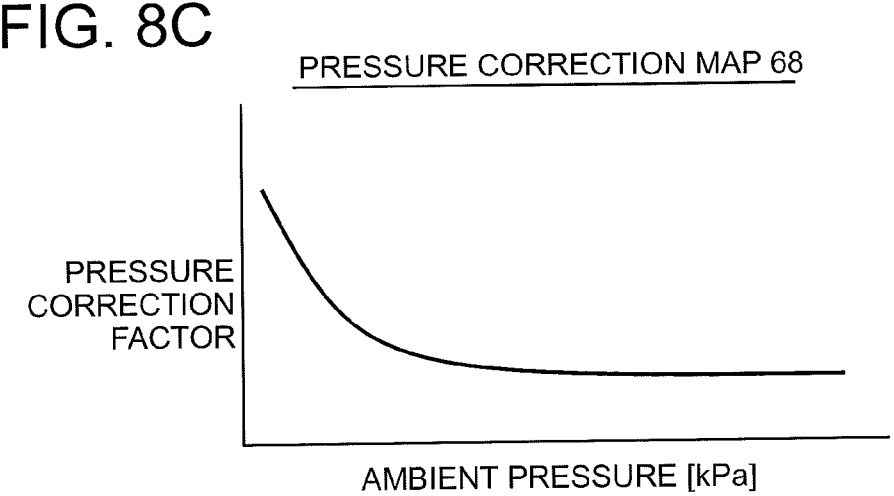
FIG. 8C is an ambient pressure correction map for obtaining a temperature of cooling water according to the second embodiment.

The relationship between the engine rotation speed (Ne) and the standard temperature of the cooling water (tw1') represents in FIG. 8A that the higher the engine rotation speed (Ne) is, the lower the standard temperature of the cooling water (tw1') becomes to a prescribed fuel injection amount, whereas the lower the engine rotation speed (Ne) is, the higher the standard temperature of the cooling water (tw1') becomes. Further, the relationship between the fuel injection amount (Qf) and the standard temperature of the cooling water (tw1') represents that the greater the fuel injection amount (Qf) is, the lower the standard temperature of the cooling water (tw1') becomes, whereas the smaller the fuel injection amount (Qf) is, the higher the standard temperature of the cooling water (tw1') becomes. Once the fuel injection amount (Qf) reaches the prescribed value, the standard temperature (tw1') of the cooling water becomes approximately the same regardless of the engine rotation speed (Ne). Further as illustrated in FIG. 8B, the higher the ambient temperature is, the smaller the temperature correction factor becomes, and as illustrated in FIG. 8C, the higher the ambient pressure is, the smaller the pressure correction factor becomes.

Figure 10:
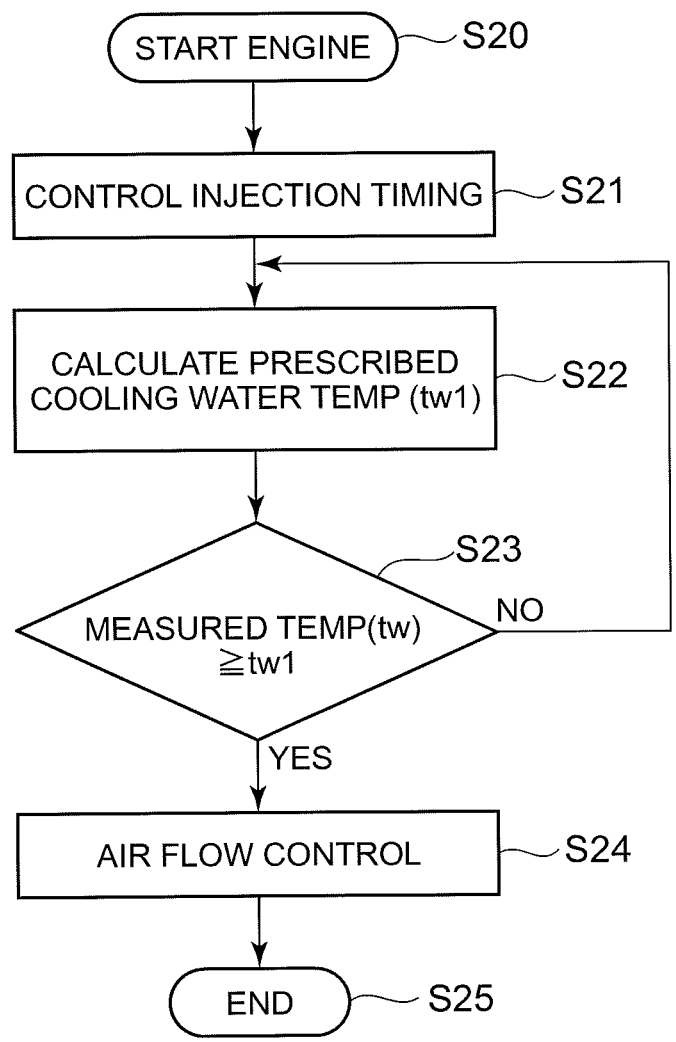
FIG. 10 is a control flow chart according to the second embodiment.

FIG. 10 is a control flow chart according to the second embodiment. As illustrated in FIG. 10, the activation timing control unit 52 according to the second embodiment, after the engine starting (S20), controls the injection timing (S21) to raise the temperature of the engine. As illustrated in FIG. 9, the prescribed temperature of the cooling water (tw1) for activating the air flow control is calculated (S22). Then, the calculated prescribed temperature of the cooling water (tw1) is compared with a temperature (tw) of the cooling water detected by the cooling water temperature detector (not illustrated) (S23). When tw≥tw1 (YES in S23), the air flow control is performed (S24). When tw<tw1 (NO in S23), the process returns to the step S22 without performing the air flow control.

The activation timing control unit 52 according to the second embodiment is configured to activate the air flow control unit 50 in the case the temperature of the cooling water is at or above a threshold value (the prescribed temperature of the cooling water: tw1). The prescribed temperature of the cooling water (tw1) is calculated, as illustrated in FIG. 9, from the standard map 66 by inputting the rotation speed (Ne) of the engine 1 and the fuel injection amount (Qf) to the standard map 66. Further, if desired, the prescribed temperature of the cooling water (tw1) is corrected by the ambient temperature and the ambient pressure of the engine operation state. Further, the temperature of the engine cooling water is obtainable by the above cooling water temperature detector or the like.

The combustion state in the engine 11 can be obtained using a temperature of lubricating oil passing through the interior of the engine instead of the temperature of the engine cooling water. More specifically, when the temperature of the lubricating oil passing through the interior of the engine 1 becomes at least the threshold value, the air flow control unit 50 may be configured to activate. In this case, the prescribed temperature of the lubricating oil (the threshold value) is calculated from the standard map by inputting the rotation speed (Ne) of the engine 1 and the fuel injection amount (Qf) to the standard map, in a manner similar to the case of using the engine cooling water. Further, if desired, the prescribed temperature of the lubricating oil may be corrected by the ambient temperature and the ambient pressure of the engine operation state, similarly to the case of using the engine cooling water. Furthermore, the temperature of the lubricating oil is detectable by a temperature sensor (not illustrated) arranged at an appropriate position in a flow path of the lubricating oil.

According to the second embodiment, the timing for activating the air flow control unit 50 can be controlled by knowing the combustion state in the engine 1 using the temperature of the engine cooling water or the lubricating oil. Thus, it is possible to secure stable combustion in the engine 1 and also to achieve temperature rise of the exhaust gas purifiers at an early stage. In this case, the threshold value of the temperature of the engine cooling water or the lubricating oil is corrected according to the ambient temperature and/or the ambient pressure and thus the timing for activating the air flow control unit 50 can be determined precisely in accordance with the ambient temperature and the ambient pressure.

Third Embodiment

Figure 11:
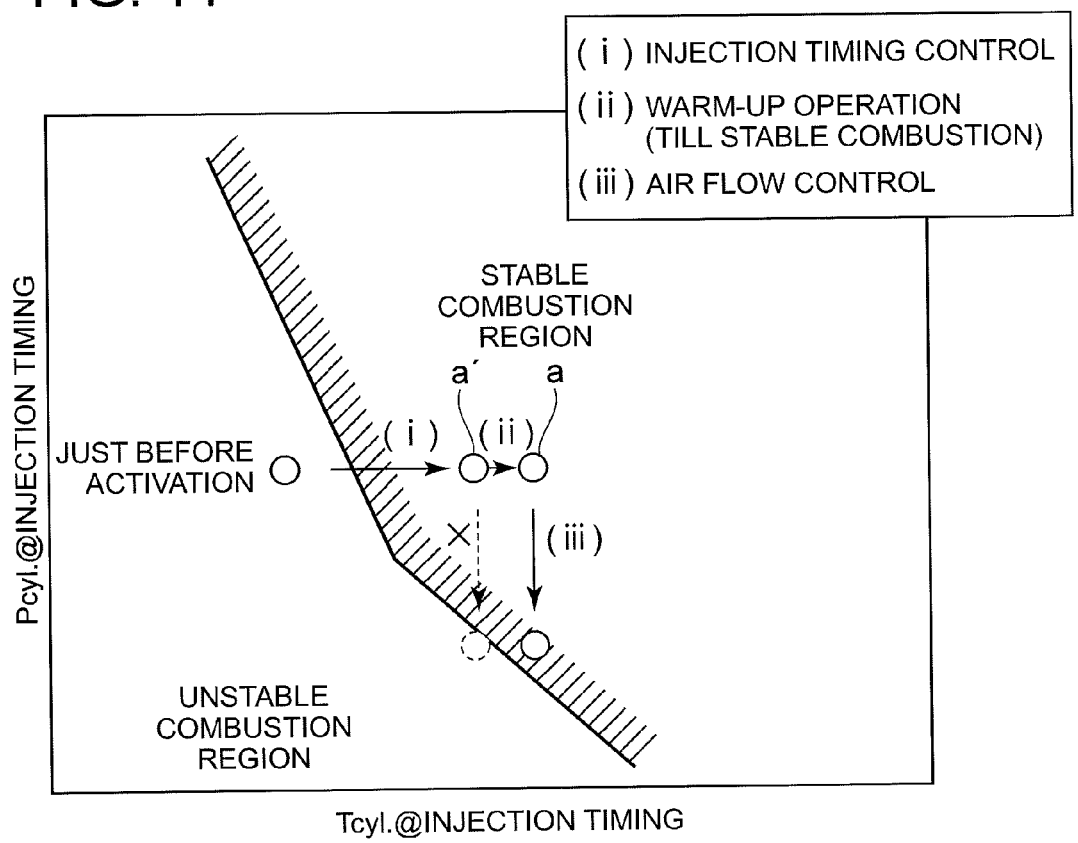
FIG. 11 is a conceptual drawing illustrating a third embodiment.

FIG. 11 is a conceptual drawing illustrating a third embodiment and represents a relationship between the timing for activating the air flow control and the engine combustion state. The activation timing control unit 52 of the third embodiment is configured to perform, after the engine starting, the injection timing control (i) and the warm-up operation (ii) of the engine 1. The activation timing control unit 52 is configured to perform the air flow control (iii) after confirming that the combustion state in the engine 1 is a "stable combustion" state.

The "stable combustion" in the present embodiment means that the combustion state in the engine 1 is stable even when the air flow control (iii) is performed. More specifically, at a point a' in FIG. 11, the combustion state in the engine 1 is not the stable combustion according to this embodiment and at a point a, the combustion state in the engine is determined to become the stable combustion of the present embodiment.

Figure 12:
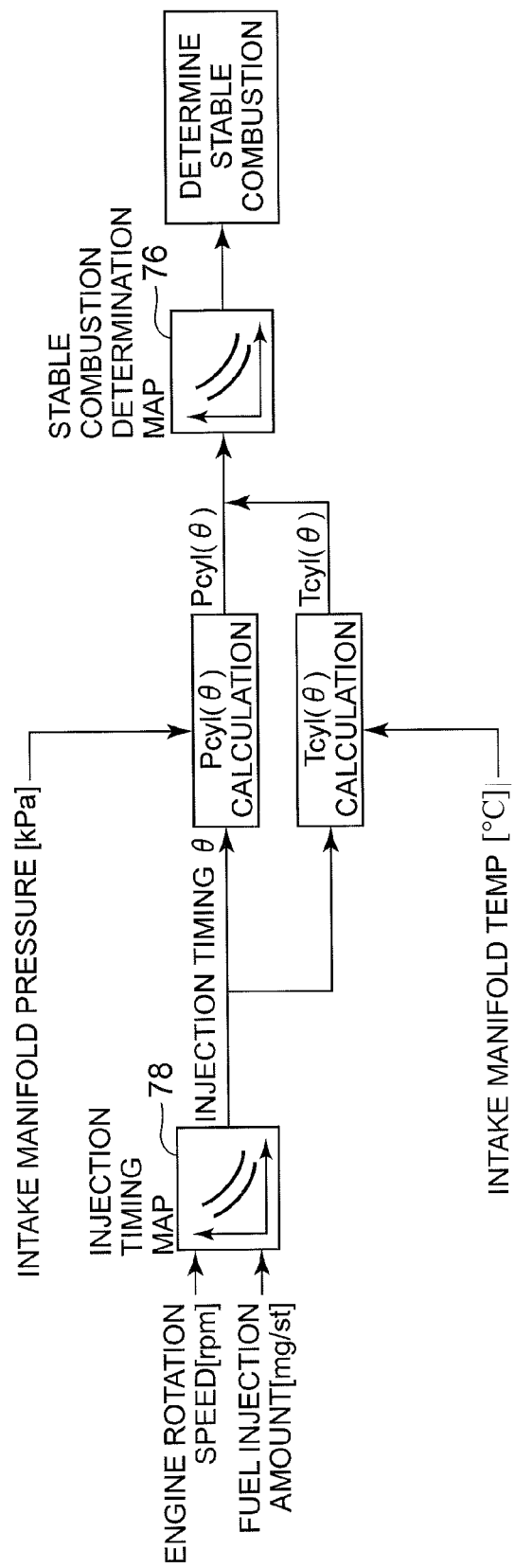
FIG. 12 is a block diagram illustrating determination of stable combustion according to the third embodiment.

It is determined whether or not the combustion state in the engine 1 is the "stable combustion" using a stable combustion determination map 76 by inputting a cylinder temperature in the cylinder ($T_{cyl}$) and a cylinder pressure in the cylinder ($Pc_{yl}$) at the fuel injection timing (θ) into the stable combustion determination map 76 as illustrated in FIG. 12. The cylinder temperature ($T_{cyl}$) at the fuel injection timing (θ) is calculated (estimated) from the air supply temperature detected by the air supply temperature sensor 41 and the fuel injection timing (θ). Further, the cylinder pressure ($P_{cyl}$) at the fuel injection timing (θ) is calculated (estimated) from the air supply pressure detected by the air supply pressure sensor 43 and the fuel injection timing (θ). Furthermore, the fuel injection timing (θ) is calculated from a map 78 by inputting the engine rotation speed (Ne) and the fuel injection amount (Qf) in the map 78.

Figure 13:
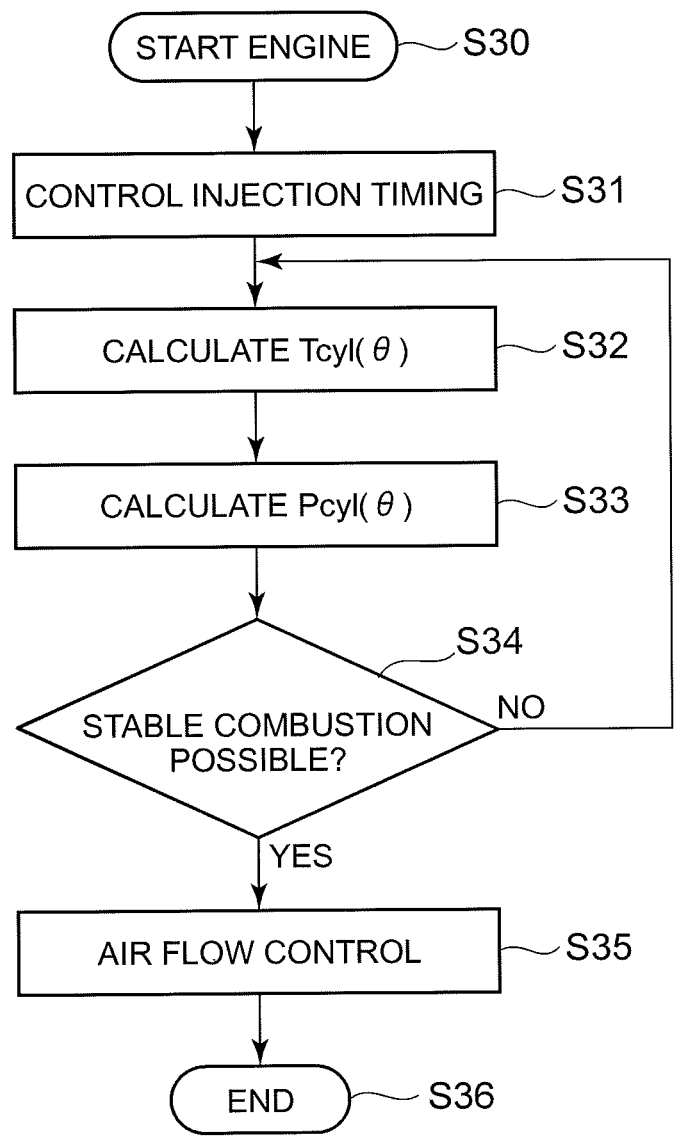
FIG. 13 is a control flow chart according to the third embodiment.

FIG. 13 is a control flow chart according to the third embodiment. As illustrated in FIG. 13, the activation timing control unit 52 according to the third embodiment, after the engine starting (S30), controls the injection timing (S31) to raise the temperature of the engine. As illustrated in FIG. 12, the cylinder temperature ($T_{cyl}$) at the fuel injection timing (θ) and the cylinder pressure ($P_{cyl}$) at the fuel injection timing (θ) are calculated (S32, S33). The steps S32 and S33 may be performed in reverse order or at the same time. Then, using the above stable combustion map 76, it is determined whether or not the "stable combustion" is possible in the engine 1 after controlling the flow rate of the air (S34). If it is determined that the stable combustion is possible (YES in S34), the air flow control is performed (S35). On the other hand, if it is determined that the stable combustion is not possible (NO in S34), the process returns to the step S32 without performing the air flow control.

The activation timing control unit 52 according to the third embodiment is configured to estimate the temperature and the pressure inside the cylinder of the engine and determine whether or not the inside of the cylinder after the air flow control is in the "stable combustion" state based on the estimated temperature and pressure inside the cylinder and then activate the air flow control unit 50.

According to the third embodiment, the combustion state in the engine 1 after the air flow control is performed is estimated with precision and then the timing for activating the air flow control unit 50 is controlled. Thus, it is possible to secure stable combustion in the engine 1 and also to achieve temperature rise of the exhaust gas purifier at an early stage.

Fourth Embodiment

Figure 14A:
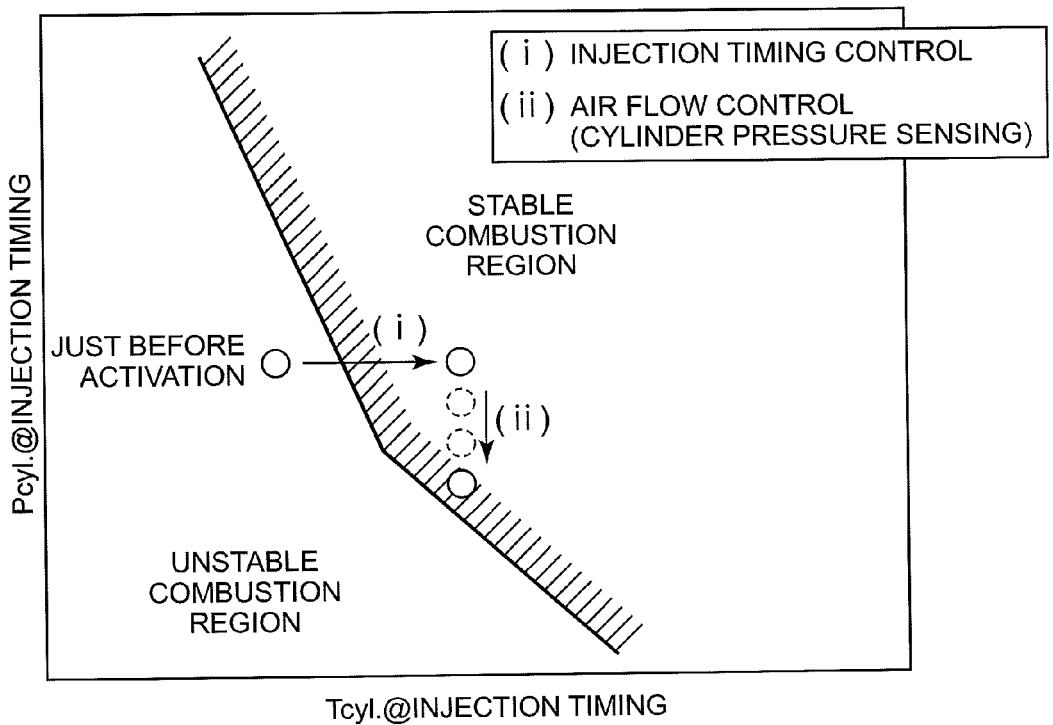
FIG. 14A is a conceptual drawing according to a fourth embodiment.
Figure 14B:
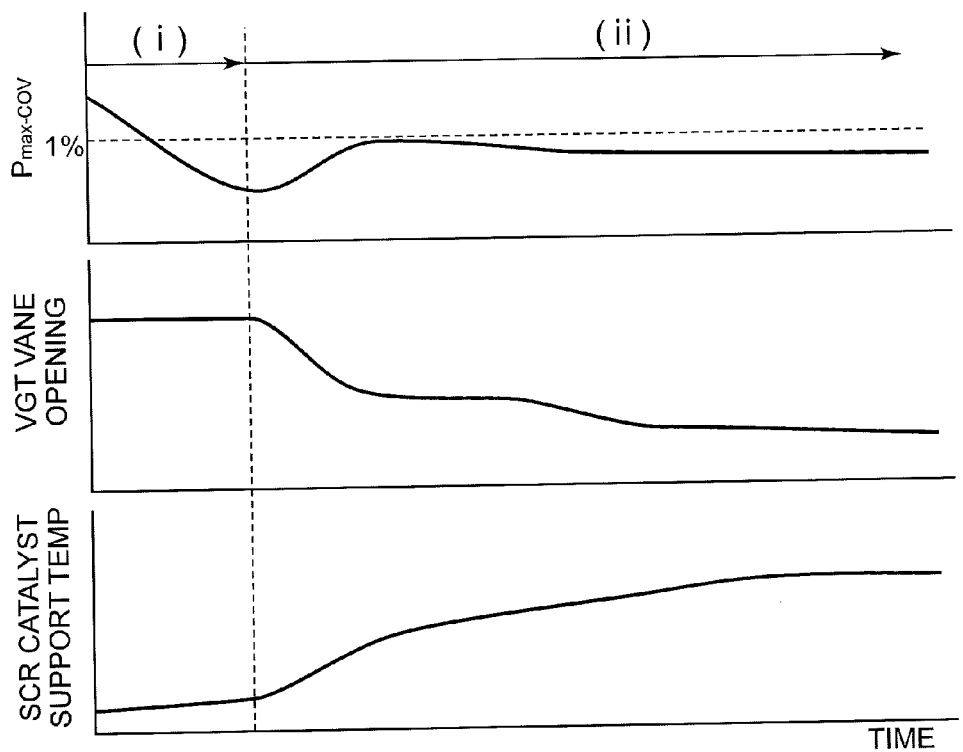
FIG. 14B is another conceptual drawing according to the fourth embodiment.

FIG. 14A is a table representing a relationship between the timing of activating the air flow control and the combustion state in the engine according to a fourth embodiment. FIG. 14B is a table representing a relationship between the engine operating time and each of a coefficient of variation of a maximum cylinder pressure ($P_{max-COV}$), a vane opening of a the variable geometry turbocharger and the temperature of the SCR catalyst support and illustrates the case where the air flow control is performed by adjusting the vane opening of the variable geometry turbocharger 11.

The activation timing control unit 52 of the fourth embodiment includes a cylinder pressure measuring unit (not shown) for measuring the pressure in the cylinder. The activation timing control unit 52 of the fourth embodiment is configured to perform, after the engine starting, the injection timing control (i) and then perform the air flow control (ii) while measuring the pressure in the cylinder by the cylinder pressure measuring unit and maintaining the engine 1 in the stable combustion state.

It is determined whether or not the combustion state in the engine 1 is the "stable combustion" based on, for instance, a coefficient of variation (cov) of the maximum cylinder pressure ($P_{max}$). More specifically, the coefficient of variation of the maximum cylinder pressure ($P_{max-COV}$) is obtained from a standard deviation σ of the maximum cylinder pressure ($P_{max}$) in a cycle of a specified time frame and an arithmetic mean value of the maximum cylinder pressure ($P_{max-avg}$) using a formula (1) below. When the coefficient of variation of the maximum cylinder pressure ($P_{max-COV}$) does not exceed a threshold value stored in the ROM of the ECU 19 in advance (e.g. 1%), it is determined that the combustion state is the stable combustion state.

$$P_{max-COV} = (\sigma(P_{max}))/(P_{max-avg}) \qquad (1)$$

Figure 15:
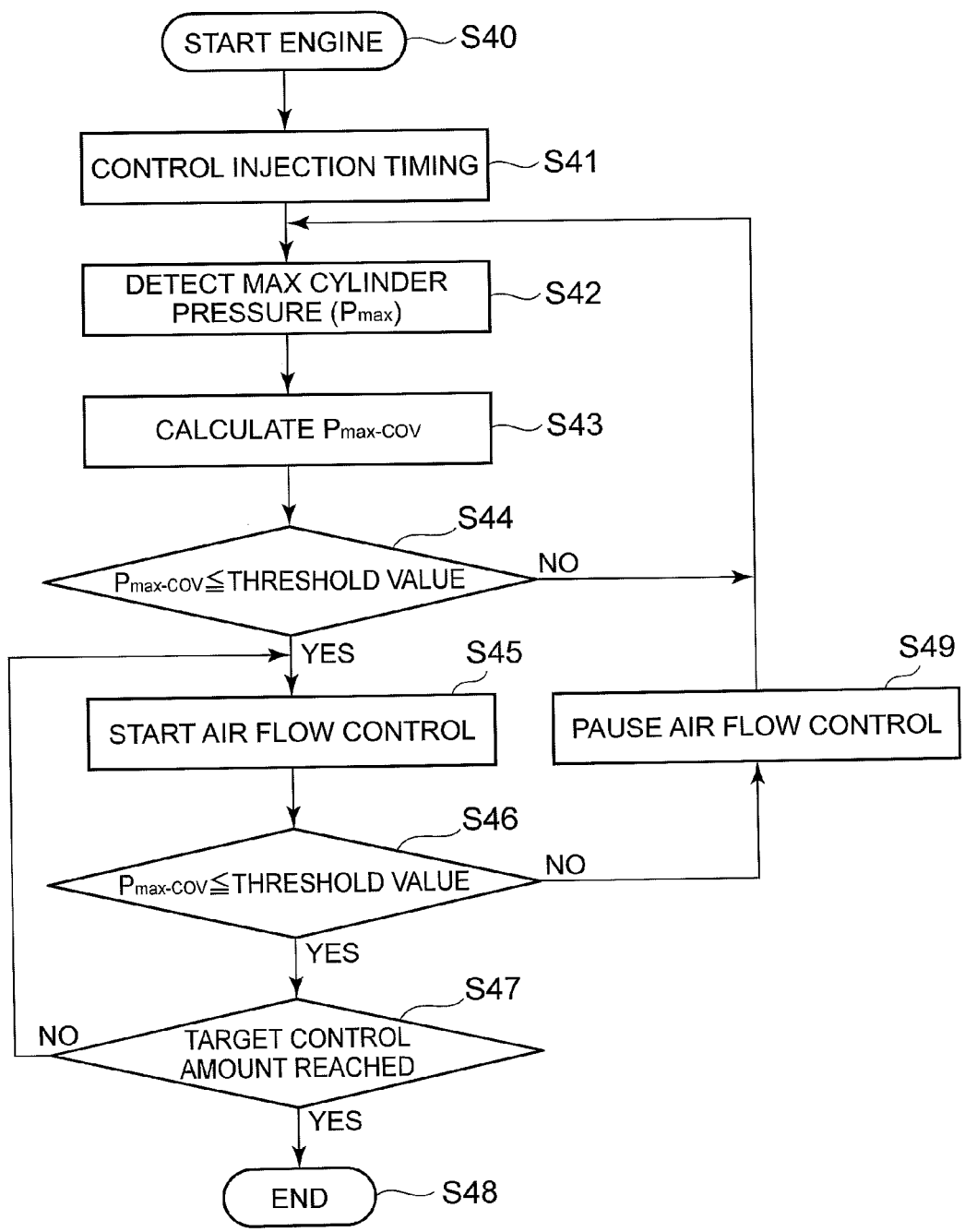
FIG. 15 is a control flow chart according to the fourth embodiment.

FIG. 15 is a control flow chart according to the fourth embodiment. As illustrated in FIG. 15, the activation timing control unit 52 according to the fourth embodiment, after the engine starting (S40), controls the injection timing (S41) to raise the temperature of the engine. The maximum cylinder pressure ($P_{max}$) is detected by the above-described cylinder pressure measuring unit (S42) and the coefficient of variation of the maximum cylinder pressure ($P_{max-COV}$) is calculated (S43). If the calculated coefficient of variation of the maximum cylinder pressure ($P_{max-COV}$) is not greater than the threshold value (YES in S44), the air flow control is performed (S45). In the air flow control, for instance, the vane opening of the variable geometry turbocharger 11 is gradually adjusted to slowly reduce the flow rate of the air supplied to the engine 1. On the other hand, if the calculated coefficient of variation of the maximum cylinder pressure ($P_{max-COV}$) is greater than the threshold value (NO in S44), the process returns to the step S42 without performing the air flow control.

Once the air flow control starts (S45), the coefficient of variation of the maximum cylinder pressure ($P_{max-COV}$) is calculated during the air flow control and is compared to the threshold value (S46). In the case where the coefficient of variation of the maximum cylinder pressure ($P_{max-COV}$) is below the threshold value (YES in S46), it is determined whether or not the air flow reaches a target control amount (S47). If the air flow has reached the target control amount, the air flow control stops there (S48). On the other hand, if the air flow hasn't reached the target control amount, the process returns to S45 to continue the air flow control. In contrast, in the case where the coefficient of variation of the maximum cylinder pressure ($P_{max-COV}$) exceeds the threshold value (NO in S46), the air flow control is paused (S49) and the process returns to a step S42.

Figure 16:
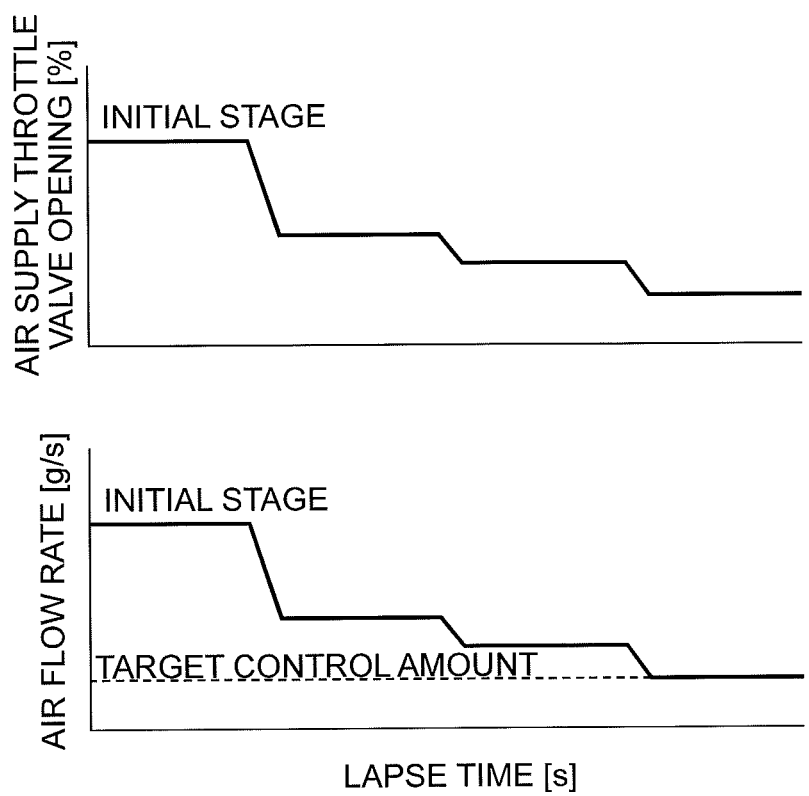
FIG. 16 is an illustration of other aspect of the fourth embodiment.
Figure 17:
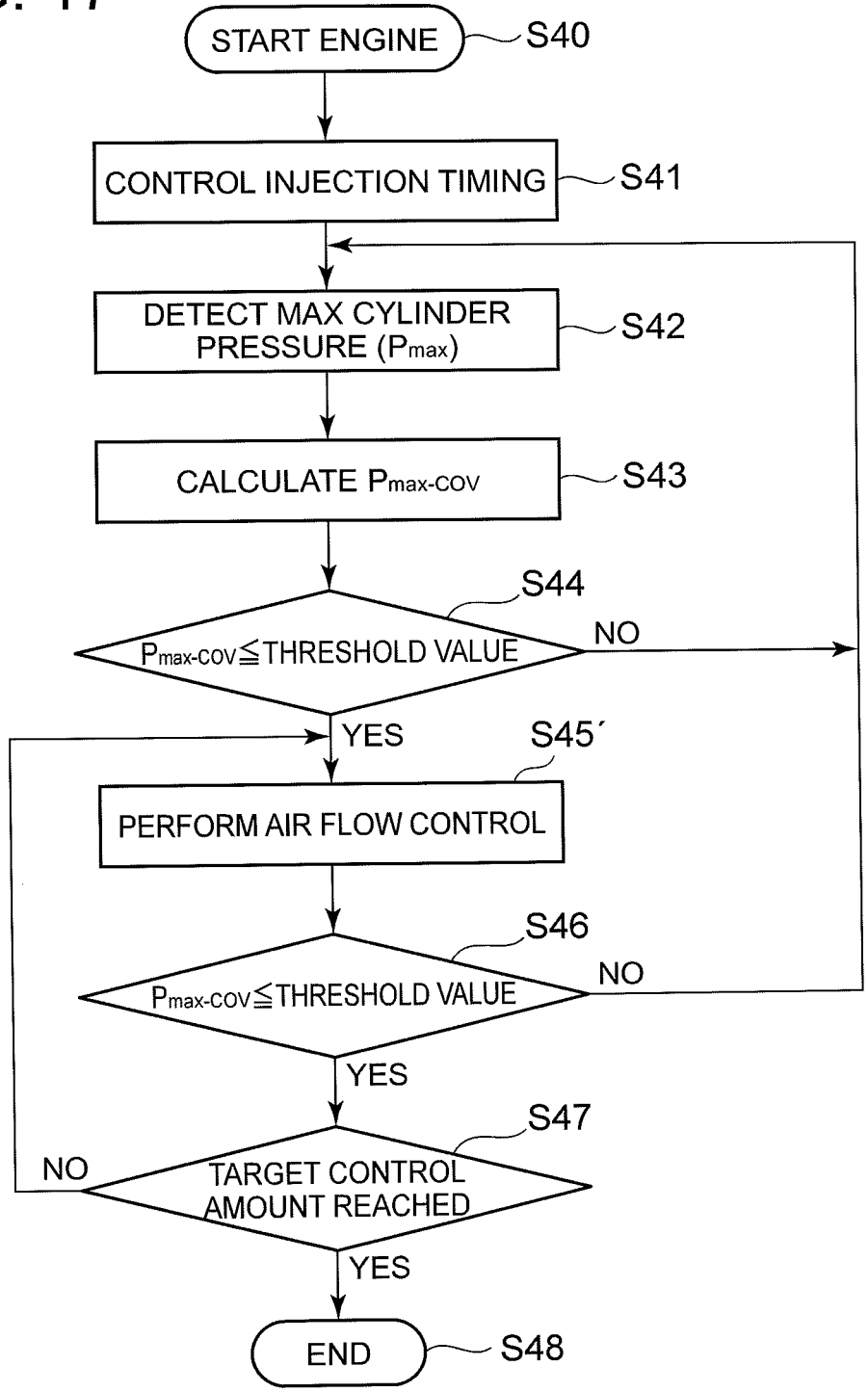
FIG. 17 is a control flow chart according to the other aspect of the fourth embodiment.
Figure 18:
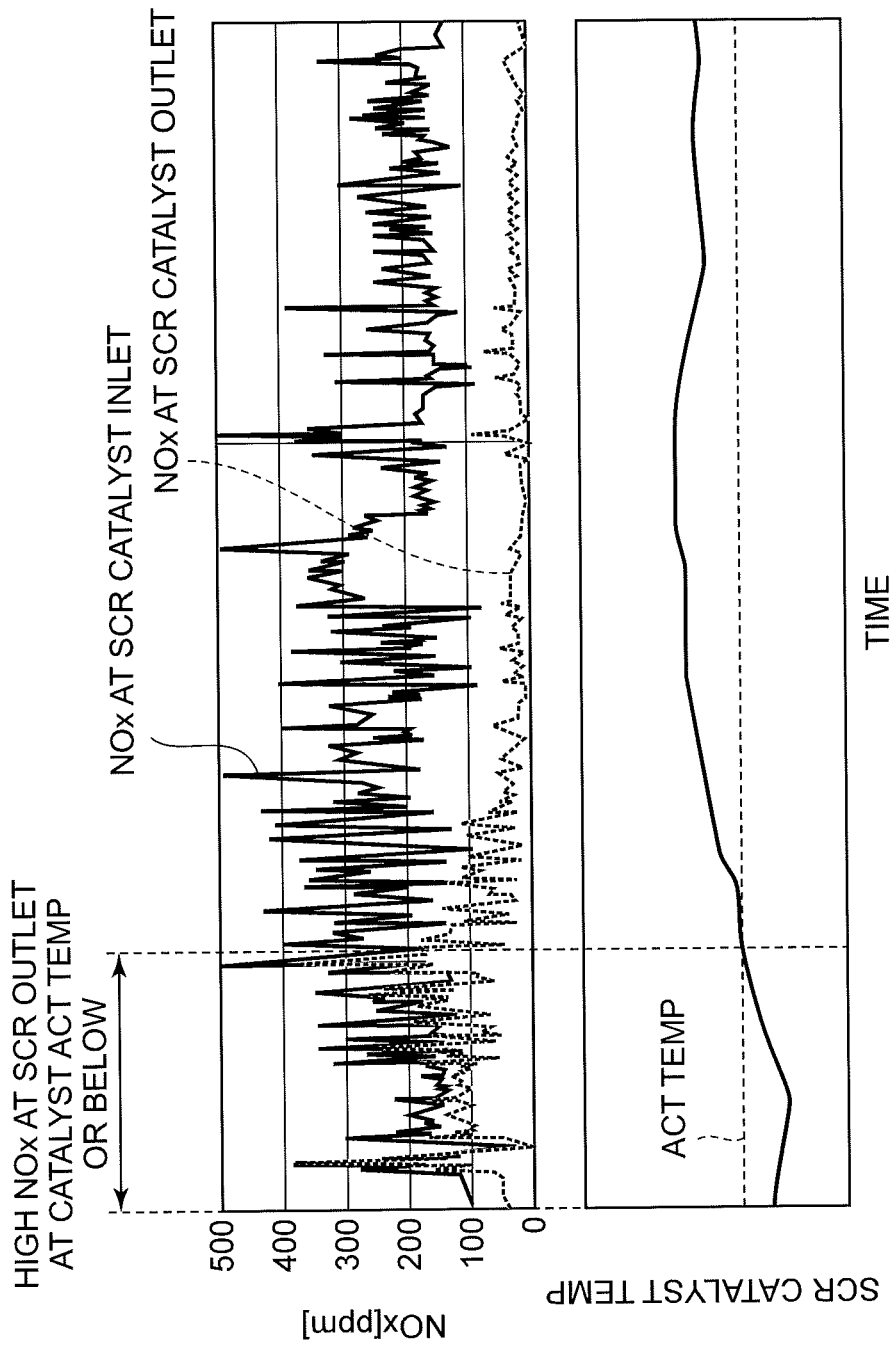
FIG. 18 is a table representing a relationship among a temperature of a catalyst support of a SCR unit, NOx concentration at an inlet/outlet of the SCR unit the engine operating time.

In the above description, the vane opening of the variable geometry turbocharger 11 is gradually adjusted to slowly reduce the flow rate of the air supplied to the engine 1. However, this embodiment is not limited to this and, for instance, the opening of the air supply throttle valve 17 may be throttled in a phased manner to adjust the flow rate of the air supplied to the engine 1 in a phased manner as illustrated in FIG. 16. A control flow of this case is illustrated in FIG. 17. More specifically, to perform the air flow control in the phased manner, start of the air flow control (S45) and pause of the air flow control (S49) in FIG. 15 are represented in FIG. 17 as one step (S45') at which the air flow control is performed.

In the above description, the combustion state in the engine 1 is determined based on the coefficient of variation of the maximum cylinder pressure ($P_{max-COV}$). However, this embodiment is not limited to this. For instance, an indicated mean effective pressure (IMEP) is obtained by the above-described cylinder pressure measuring unit and the combustion state in the engine 1 is determined based on coefficient of variation of the IMEP.

The activation timing control unit 52 according to the fourth embodiment is provided with the cylinder pressure measuring unit (not shown) for measuring the cylinder pressure in the cylinder of the engine 1 and is configured to detect the combustion state in the engine 1 in real time based on the cylinder pressure measured by the cylinder pressure measuring unit and to control the timing for activating the air flow control unit 50.

According to the fourth embodiment, combustion stability in the engine 1 is obtainable in real time directly using the cylinder pressure measuring unit and at the same time, the timing for activating the air flow control unit 50 can be controlled. Therefore, it is possible to secure stable combustion in the engine 1 and also to achieve temperature rise of the exhaust gas purifier at an early stage.

While the embodiments of the present invention have been described, it is obvious to those skilled in the art that various changes may be made without departing from the scope of the invention.

For instance, in the description of the above embodiments, the SCR unit 9 is used as the exhaust gas purifier whose temperature is raised using the air flow control unit 50. However, the exhaust gas purifier of these embodiments is not limited to this and may include the DOC unit, DPF unit 7 or the like as well. These embodiments are applicable as an exhaust gas purification system for an internal combustion engine equipped with the DOC unit 5 and the DPF unit 7.

In the description of the above embodiments, the injection timing control is performed prior to the air flow control. However, this is not limitative and the injection timing control may not be performed.

INDUSTRIAL APPLICABILITY

According to the embodiments, this exhaust gas purification system may be used as an exhaust gas purification system for a diesel engine equipped with exhaust gas purifiers such as DOC, DPF and SCR.

The invention claimed is:

1. An exhaust gas purification system for an internal combustion engine provided with an engine, an exhaust passage where exhaust gas exhausted from the engine passes, and an exhaust gas purifier installed in the exhaust passage, the system comprising:
   an air flow control unit for reducing a flow rate of air to be supplied to the engine so as to raise a temperature of the exhaust gas exhausted from the engine; and
   an activation timing control unit for controlling a timing of activating the air flow control unit,
   wherein the activation timing control unit is configured to control the timing of activating the air flow control unit so that a combustion state in the engine does not become unstable when the air flow control unit is activated and the air to be supplied to the engine is reduced,
   wherein the activation timing control unit is configured to estimate a temperature and a pressure in a cylinder of the engine and control the timing of activating the air flow control unit based on the estimated temperature and pressure in the cylinder of the engine, and
   wherein the activation timing control unit is configured to determine whether or not an inside of the cylinder after the air flow control is in a stable combustion state based on a stable combustion determination map having the temperature and pressure in the cylinder at a fuel injection timing of the engine as input data and, when it is determined that the inside of the cylinder is in the stable combustion state, then activate the air flow control unit.

2. An exhaust gas purification system for an internal combustion engine provided with an engine, an exhaust passage where exhaust gas exhausted from the engine passes, and an exhaust gas purifier installed in the exhaust passage, the system comprising:
   an air flow control unit for reducing a flow rate of air to be supplied to the engine so as to raise a temperature of the exhaust gas exhausted from the engine; and
   an activation timing control unit for controlling a timing of activating the air flow control unit,
   wherein the activation timing control unit is configured to control the timing of activating the air flow control unit so that a combustion state in the engine does not become unstable when the air flow control unit is activated and the air to be supplied to the engine is reduced,
   wherein the activation timing control unit comprises a pressure detector for determining a pressure in a cylinder of the engine, and
   wherein the air flow control unit is configured to reduce the flow rate of the air supplied to the engine gradually or in a phased manner so that a coefficient of variation of the pressure in the cylinder detected by the pressure detector does not exceed a threshold value which is set in advance.

* * * * *